United States Patent [19]

Marcott

[11] Patent Number: 4,688,304
[45] Date of Patent: Aug. 25, 1987

[54] TARP FASTENER

[76] Inventor: Roger F. Marcott, 18421 S. Valley Vista Rd., Mulino, Oreg. 97042

[21] Appl. No.: 792,242

[22] Filed: Oct. 29, 1985

[51] Int. Cl.⁴ ............................................. A44B 21/00
[52] U.S. Cl. ........................................ 24/459; 24/464; 24/519; 135/119
[58] Field of Search ................ 24/464, 465, 466, 469, 24/471, 473, 476, 543, 115 L, 459, 265 R, 122.6 R; 160/330; 52/3; 135/119

[56] References Cited

U.S. PATENT DOCUMENTS

| | | | |
|---|---|---|---|
| 358,195 | 2/1887 | Griswold | 52/3 |
| 623,987 | 5/1899 | Conover | 24/471 |
| 644,242 | 2/1900 | Combs | 52/3 |
| 761,956 | 6/1904 | Gorton | 24/519 |
| 897,911 | 9/1908 | Lorentz | 24/519 |
| 1,013,474 | 1/1912 | Boyd | 24/459 |
| 1,426,636 | 8/1922 | Hawie | 24/464 |
| 2,093,231 | 9/1937 | Broadwell | 24/464 |
| 2,278,912 | 4/1942 | Busse | 24/543 |
| 2,639,751 | 5/1953 | Flaherty | 52/3 |
| 2,745,163 | 5/1956 | Van Buren, Jr. | 24/464 |
| 2,939,195 | 6/1960 | Carlson | 24/459 |
| 3,162,920 | 12/1964 | Durham | 24/265 R |
| 3,225,408 | 12/1965 | Durham | 24/265 R |
| 3,346,927 | 10/1967 | Tompkins | 24/464 |
| 3,486,788 | 12/1969 | Benton | 135/119 |
| 3,556,104 | 1/1971 | Janklow | 24/543 |
| 3,686,711 | 8/1972 | Kuramoto et al. | 24/265 R |
| 3,936,912 | 2/1976 | Flanagan, Jr. | 135/119 |

Primary Examiner—Victor N. Sakran
Attorney, Agent, or Firm—Klarquist, Sparkman, Campbell, Leigh & Whinston

[57] ABSTRACT

The tarp fastener is a device consisting of a metal ring used in conjunction with a rubber ball to attach to and secure plastic tarps or any flexible material such as cloth, rubber, etc.

2 Claims, 7 Drawing Figures

U.S. Patent   Aug. 25, 1987   Sheet 1 of 2   4,688,304
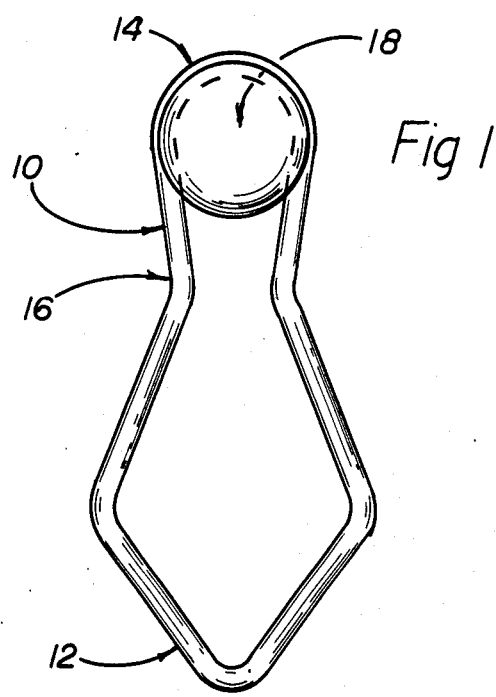
Fig 1
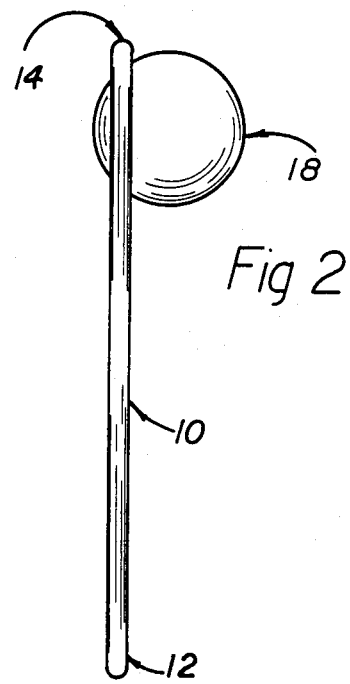
Fig 2
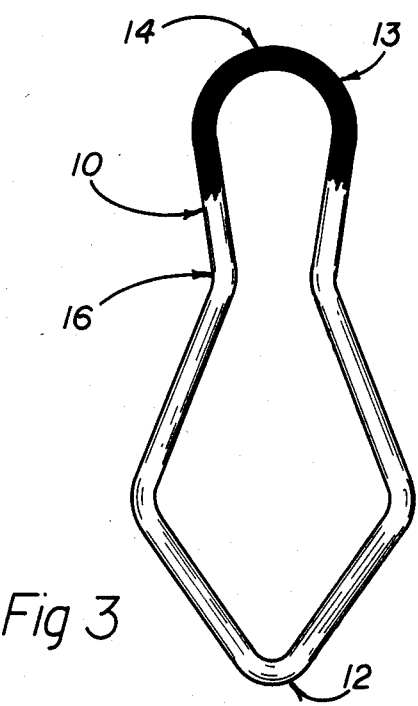
Fig 3
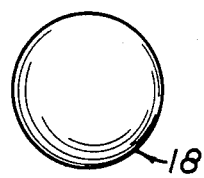

TARP FASTENER

This application is a continuation of application Ser. No. 463,387, filed May 12, 1983 now abandoned.

SUMMARY OF THE INVENTION

I am applying for a patent on a device which I call a tarp fastener. It consists of two parts, a metal ring and a rubber ball which I made and use to anchor sheets of plastic as covering over boats, motorcycles, cars, etc. The device that I want the patent on is the metal ring which will be used in conjunction with a rubber ball which securely fastens onto any part of a plastic tarp. The unique thing about the tarp fastener is it can be very quickly attached to any part of a plastic tarp and be removed without any damage to the plastic sheet. The thickness of plastic that I use the tarp fastener with is four mil. It is able to withstand a great deal of stress caused by wind and rain. The amount of stress the plastic can withstand depends on the number of tarp fasteners attached to the edges of the plastic tarp. I place the tarp fastener about two feet apart along the edges of the plastic and tighten the anchor lines sufficiently to prevent wind damage. This tarp fastener could also be used with thicker plastic tarps and would provide an even more secure covering. In addition to being used as a fastener for tarps covering cars and boats, it could also be used to construct a temporary shelter with plastic sheeting such as a lean-to in the outdoors.

The usual types of tarps used today are ones fitted with grommets along a reinforced edge of fairly heavy material of a specific size or shape which are quite expensive, or are a form fitted tarp such as the ones that are designed for motorcycles, boats, cars, etc., also quite expensive. The tarp fastener can be used to secure plastic sheeting of any size or shape over any kind of object. These tarp fasteners would be very inexpensive to produce because they are made of ten gauge wire and can be used with inexpensive plastic sheeting. The tarp fastener is almost indestructible and can be used over and over again for years.

The tarp fastener could be used to secure any type of material flexible enough to fit through the ring; cloth, rubber, plastic, dacron, etc. Some of its advantages include:

1. The tarp fastener can be attached or detached very quickly.
2. It can be attached to any point or place on the surface of a tarp.
3. It does not damage in any way the plastic sheeting it is attached to.
4. It will not detach or slip from the position it was attached as long as tension is maintained on the anchor line.
5. The more tension is placed on the anchor line, the greater the hold or grip of the tarp fastener.

BRIEF DESCRIPTION OF DRAWINGS

My first drawing shows three tarp fasteners:
FIG. 1, a top view with the ball in locking position;
FIG. 2, a side view with the ball in locking position;
FIG. 3, a top view showing the actual size and shape of the tarp fastener.

Figure 4:
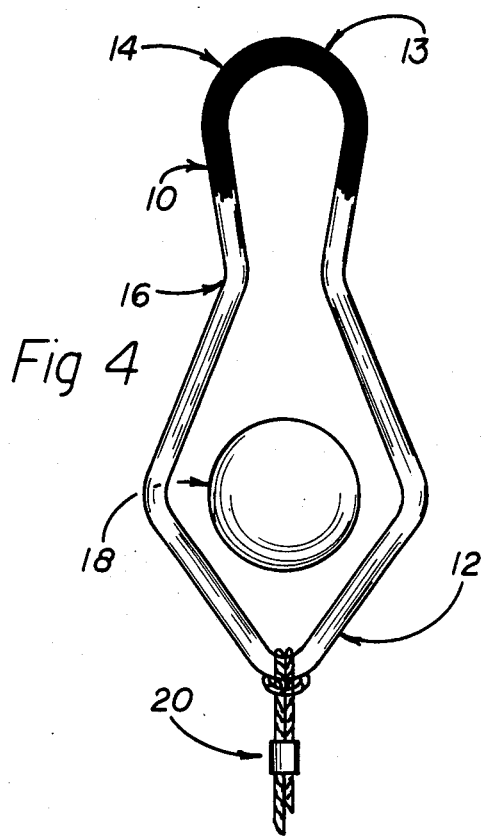
Figure 5:
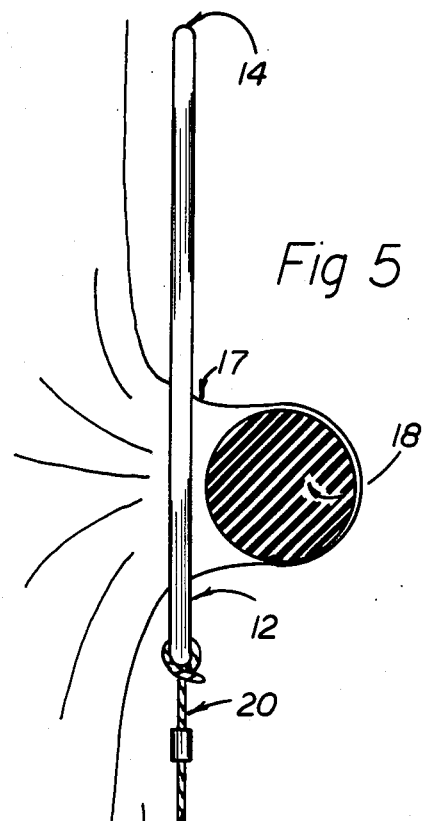

My second drawing shows in FIG. 4 a top view and in FIG. 5 a side view of the ball as it is inserted with a plastic tarp through the bottom and larger end of a ring.

Figure 6:
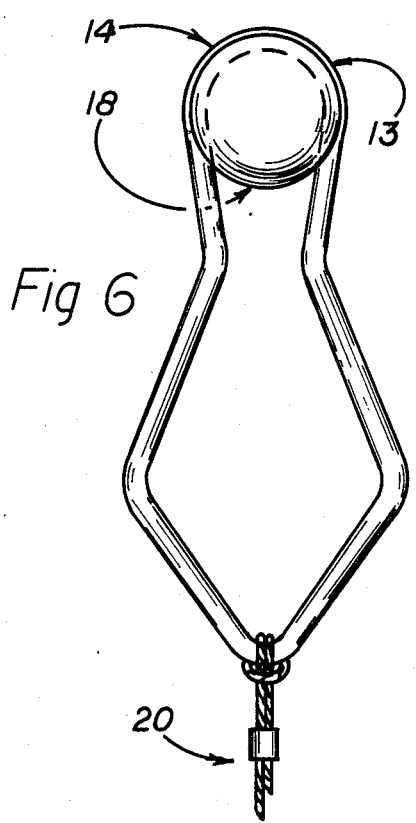
Figure 7:
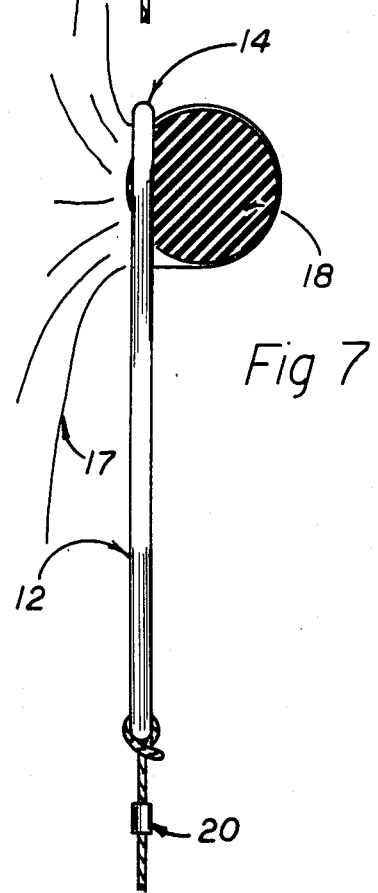

FIGS. 6 and 7 show the ring pulled downward, forcing the ball and the plastic tarp through a neck into an upper and smaller part of the ring, locking the ball and plastic into position.

DETAILED DESCRIPTION

My description of the tarp fastener is as follows. The tarp fastener is a solid metal ring 10, with no open breaks, constructed of ten gauge (approximately 3/16 inch) steel wire. The metal ring (tarp fastener) has two ends, one small 12 and one large 14 with an indented neck 16 between them of sufficient width to freely pass multiple layers of material as shown in FIG. 5 and FIG. 7. Its shape is somewhat like that of a bowling pin with a rounded yet pointed bottom as pictured in FIG. 3 on the first page of my drawing. My method of making the metal ring (tarp fastener) was to make a form block of the ring and bend wire around it to the desired shape. I then cut off the excess wire at the bottom of the ring formed and welded the wire ends together.

The ring is approximately 3¾ inches long and approximately 1⅝ inches wide at its widest and ¾ inches wide at its narrowest point, or neck. My drawings show the actual size and shape of the ring I have made and tested. Referring to FIGS. 1 and 3, the elongated ring defines an elongated opening with the first end 12 and the second end 14 opposite the first end. The first end 12 is larger and the second end 14 smaller than the diameter of a ball 18 so that the ball passes completely through the first end 12 when covered by the sheet material but does not pass through the second end 14. The first end 12 is pointed for centering an anchor line 20 lenthwise of the ring as tension is applied to the anchor line. The indented neck 16 between the two ends is of a reduced width and length, both less than the diameter of the second end 14 to facilitate movement of the ball 18 and sheet material between the two ends.

Considering the ring in more detail FIG. 1 shows that the first or large end is substantially diamond shaped, having a length greater than its width. The first end tapers linearly toward neck 16 to form an acute angle, of about 50°, where it joins the second end 14. The first end tapers also to a slightly round point opposite neck 16. The elongated shape of the large end and the point facilitates passing of the ball and material through it as well as centering the anchor line 20.

The second end 14 is only partially circular, as shown in the drawings. It tapers linearly toward neck 16 to form an acute angle, of about 30°, where it joins the first end 12.

The ring is also plated to prevent rust and covered with a soft plastic coating 13 to provide greater protection and grip for the plastic sheeting. The type of plastic coating I used is called Plastic Dip, (1,1,1 trichlorethane, methylene, chloride). The type of machine used to manufacture the ring would be of a kind designed to form wire to a desired shape modified to the particular shape of the tarp fastener.

As shown in FIG. 1, the ball 18 that I use with the ring to form a tarp fastener is one inch in diameter, 1.3 times the diameter of the second end 14. The ball comprises rubber, as shown by the ball's alternating black-and-white cross hatching.

The method of using the tarp fastener is to place the ring on top of the sheet of plastic 17, or plastic tarp, and then placing a one inch diameter rubber ball 18 under the tarp. I then push the rubber ball with plastic sheeting through the larger end 14 of the ring as shown in FIG. 5. Then by pulling downward on the anchor line 20 attached to the bottom of the ring, I force the ball and plastic through the neck 16 into the smaller end 12 of the ring. The plastic sheeting is then held firmly between the ball and ring as shown in FIG. 7. The ball remains firmly seated with plastic tarp in the upper and smaller end of the ring as long as a downward tension is maintained on the anchor line. The free end of the anchor line can be attached to anything solid by hooks or by tying. Larger balls would be used in conjunction with proportionally larger rings.

I claim:

1. A device for covering objects including vehicles, wood, and the like, comprising:

a tarp for covering the object, the tarp comprising a flexible sheet material having opposite first and second sides;

a ball positioned on the first side of tarp;

an elongated wire ring of generally bowling pin shape positioned on the second side of the tarp, the ring defining an opening with a diamond-shaped first end, a circular second end opposite the first end, and a neck having a length less than the width of the second end for joining the ends, said first end being larger and said second end being smaller than the diameter of the ball so that said ball passes completely through said first end when covered by said sheet material but does not pass through said second end and clamps the sheet material between said ball and said ring at said second end, said first end tapering linearly inward toward the neck to form an acute angle with the neck to facilitate movement of the sheet-covered ball toward the second end; and tensioning means secured to said first ring and including an anchor line for anchoring the first end of the ring to an attachment point the ball being separate from the ring and anchor line so that the ring and ball can be connected to any part of the tarp;

said diamond-shaped first end tapering linearly away from the neck to a point for centering said anchor line lengthwise of said ring as tension is applied to the tensioning means.

2. A device according to claim 1, wherein the acute angle formed at the neck by opposite sides of the large end is about 50°.

* * * * *

UNITED STATES PATENT AND TRADEMARK OFFICE
CERTIFICATE OF CORRECTION

PATENT NO. : 4,688,304
DATED : August 25, 1987
INVENTOR(S) : Roger F. Marcott

It is certified that error appears in the above-identified patent and that said Letters Patent is hereby corrected as shown below:

Cover page, insert after the application number and filing date:

--Related U.S. Application Data

Continuation of Ser. No. 463,387, May 12, 1983, now abandoned.--

Column 3, line 22, after "end" [second occurrence] insert --having a plastic coating thereon for frictionally gripping said tarp--.

Signed and Sealed this

Nineteenth Day of January, 1988

Attest:

DONALD J. QUIGG

Attesting Officer      Commissioner of Patents and Trademarks